Jan. 5, 1965  S. A. PURSKI  3,164,312
APPARATUS FOR BREAKING WHEELS
Filed July 15, 1963  2 Sheets-Sheet 1

INVENTOR.
S. A. PURSKI
BY
Fetherstonhaugh & Co.
ATTORNEYS

Jan. 5, 1965  S. A. PURSKI  3,164,312
APPARATUS FOR BREAKING WHEELS
Filed July 15, 1963  2 Sheets-Sheet 2
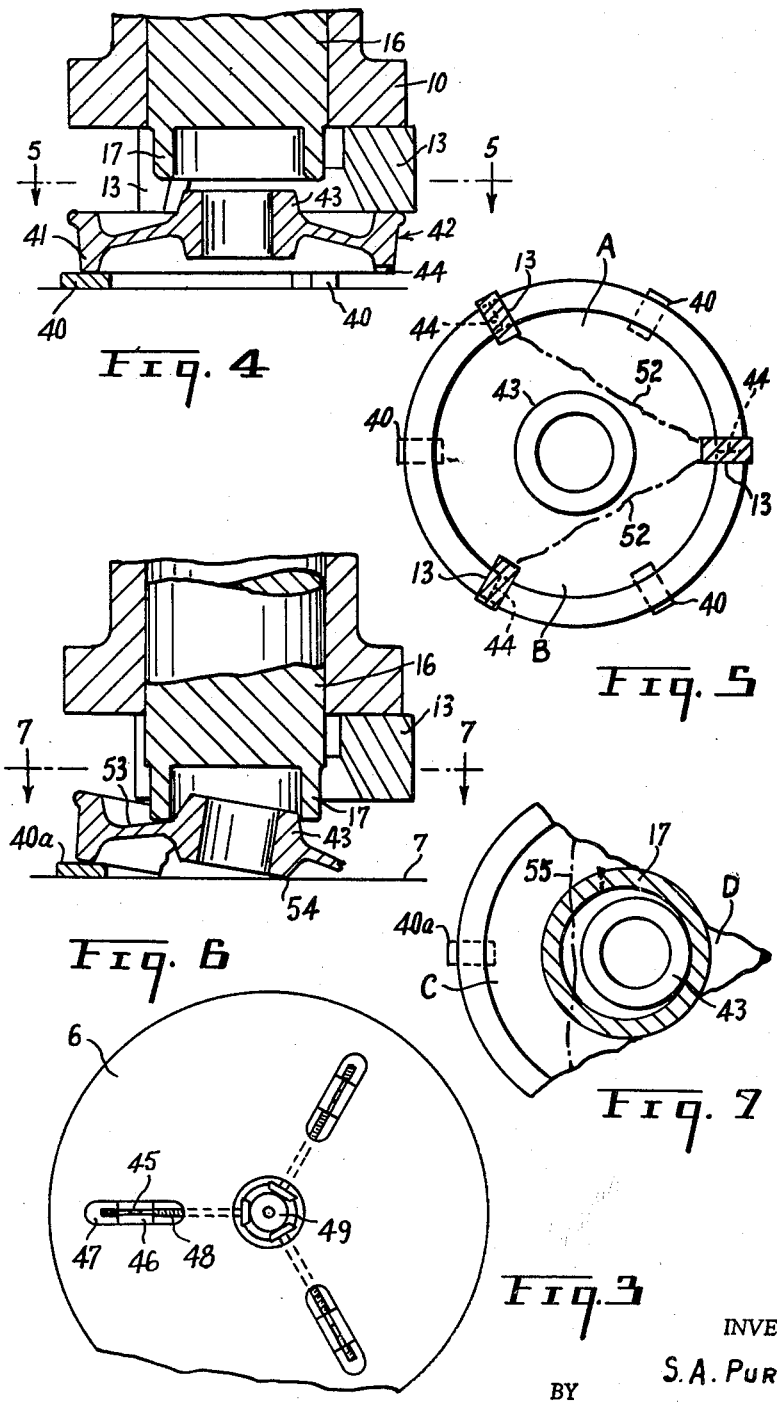
INVENTOR.
S. A. PURSKI
BY
Fetherstonhaugh & Co.
ATTORNEYS

United States Patent Office

3,164,312
Patented Jan. 5, 1965

3,164,312
APPARATUS FOR BREAKING WHEELS
Stanislaw Antoni Purski, 1430 Depatie, St. Laurent,
Quebec, Canada
Filed July 15, 1963, Ser. No. 295,137
5 Claims. (Cl. 225—94)

This invention relates to an apparatus for breaking wheels and particularly to the breaking up of railway car wheels into parts of approximately equal size and weight.

In making use of discarded railway car wheels in a melting furnace for the casting of new wheels, it is desirable that the discarded wheels be broken up into pieces of approximately uniform size before loading the furnace. However, in practice it has been found nearly impossible to break up wheels into pieces of uniform size by the usual method of dropping a heavy weight on the wheel. This is on account of the design of the wheel which has a heavy rim and boss section protecting the weaker web of the wheel from breaking under the dropping weight. Furthermore, the breaking up of cast steel wheels has been found to be rather expensive and their use as part of the furnace load is limited. This is on account of the fact that it sometimes required the heavy weight to be dropped a number of times before the wheel would break, and when a break did occur, the pieces were not suitable for loading into a furnace and additional efforts to break up the pieces only added to the expense. Consequently, quantities of scrap wheels have been left un-used.

The present invention consists essentially in first preparing the scrap wheel for breaking up into uniform pieces by notching the rim on that side of the wheel which projects axially from the adjacent face of the wheel boss. The notching is preferably made at 120° intervals around the rim. The wheel is then laid with its notched rim resting on three support blocks spaced at 120° intervals and located midway between the notches on the wheel. A load is then applied to the wheel at three points immediately above the notches on the wheel. The application of this load to the wheel results in the wheel rim splitting at each of the notches and the breaking off of two 120° sectors, with the break extending across the web of the wheel, from the notch which took the load first, to the other two notches. This leaves a third sector of the wheel with its rim portion still resting on its underlying support block and with the boss section resting on the support surface below. A second load is applied to this third sector of the wheel and this load contacts the inclined sector at a point between the boss section and the rim of the wheel on a radial line passing through the underlying support block, with the result that the boss section breaks away from the remaining portion of the rim section. The wheel is thus broken into three rim sections and a boss section, all of approximately the same size and weight. By incorporating the two loads in a single apparatus the two steps of breaking the wheel into four pieces, can be carried out one after the other with a single setting of the wheel in the apparatus.

The object of the invention is to provide means for breaking scrap wheels into a number of pieces of approximately equal size and weight.

A further object of the invention is to provide means for breaking scrap wheels in a press apparatus.

A further object of the invention is to provide a press apparatus having concentric load applying means one of which will make a first break on the wheel and the other of which will first hold one piece of the wheel and successively apply a load to further break the held piece.

These and other objects of the invention will be apparent from the following detailed specification and the accompanying drawings in which:

FIG. 3 is a plan view on the line 3—3 of FIG. 1.

FIG. 4 is a partial vertical section showing the setting up of a wheel in the press unit before the application of a load to the wheel.

FIG. 5 is a plan view on the line 5—5 of FIG. 4 showing the notching of the wheel, the location of the wheel support blocks and the load applying fingers and with chain dot lines indicating the lines of break of the wheel under the application of the first load.

FIG. 6 is a partial vertical section similar to FIG. 4 but showing a sector of the broken wheel being held for the application of a second load.

FIG. 7 is a plan view on the line 7—7 of FIG. 6 showing by chain dot line the line of break of the wheel sector into two pieces.

Figure 1:
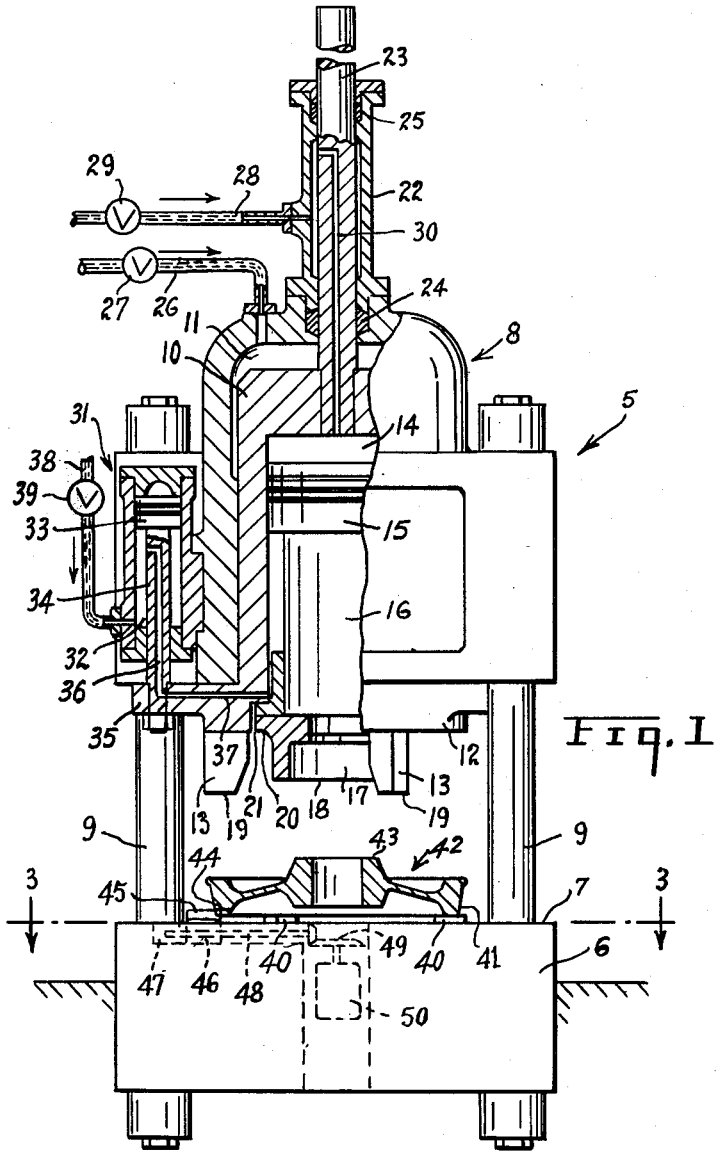
FIG. 1 is a vertical elevation partly in section of a press unit for carrying out the invention.

Referring to the drawings the wheel breaking press shown in FIG. 1 is typical only. It is to be understood that other types of press units can be used to carry out the breaking of wheels in the desired manner.

The press unit hereby designated by the numeral 5 consists of a base member 6 having a flat top surface 7 and a cylinder-piston unit 8 supported preferably on four corner posts 9 of which only two are shown in FIG. 1. A piston 10 is reciprocatingly mounted in the outer cylinder 11. The lower end of the piston 10 has an annular flange 12 having three press fingers 13 spaced at 120° intervals about the axis of the unit 8.

The piston 10 is of hollow construction and forms a cylinder 14 within which is reciprocatingly mounted the piston 15 having a lower portion 16 of reduced diameter. Secured to the lower end of the reduced portion 16 of the piston 15 is the annular press ring 17 whose lower edge 18 is located in a horizontal plane above the lower edges 19 of the press fingers 13 when both pistons 10 and 15 are in the withdrawn position shown in FIG. 1. The press ring 17 is provided with an annular flange 20 engaging in a recess 21 in the lower end of the piston 10.

A cylinder 22 is mounted on the top of the outer cylinder 11 in axial alignment with the pistons 10 and 15 and a rod 23 secured axially to the top of the piston 10 passes upwards and through the cylinder 22. Packing means 24 about the rod 23 seals against leakage between the cylinders 11 and 22 and a similar packing means 25 seals the top end of the cylinder 22 against leakage.

Hydraulic fluid is fed to the cylinder 11 through the pipe 26 and is controlled by the valve 27. Similarly, hydraulic fluid is fed to the cylinder 22 by the pipe 28 and is controlled by the valve 29. The cylinder 22 acts as a reservoir from which hydraulic fluid is permitted to flow freely to the cylinder 14 through the passage 30 in the rod 23. The valve 27 therefore controls the downward movement of the piston 10 which carries with it the piston 15, while the valve 29 controls the downward movement of the piston 15 independently of the piston 10.

In order to obtain the withdrawal of the pistons 10 and 15 to their original positions as seen in FIG. 1 a cylinder and piston device 31 is mounted on the side of the unit 8 and comprises a cylinder 32, a piston 33 and a piston rod 34. The lower end of the piston rod 34 is secured to an extension 35 of the annular flange 12 and is provided with an axial passageway 36 connecting at one end with the interior of the cylinder 32 and at the other end with the passageway 37 leading to the interior of the cylinder 14. Hydraulic fluid is fed to the cylinder 32 through the pipe 38 and is controlled by the valve 39 and, when fluid is permitted to flow into the cylinder 14 acts on the underside of the piston 15 to retract the piston 15 and with it the piston 10.

Mounted on the top surface 7 of the base member 6 of the press are a series of wheel support blocks 40 usually three in number. These blocks 40 are spaced apart equally at 120° intervals on a circle whose axis is in line with the axis of the unit 8 and support the rim 41 of the wheel 42 which is to be broken. The location of the blocks 40 is such that they are spaced midway between the vertical plane of the press fingers 13 immediately above, and the hub 43 of the wheel is axially aligned and will be surrounded by the annular press ring 17 when the pistons 10 and 15 are lowered.

The notches 44 on the wheels 42 can be made before the wheels are mounted on the press unit 5. However, the notching operation can also be performed on the same press and with the same wheel setting by providing retractable notching tools arranged on the top surface 7 of the press block 6.

In FIGS. 1 and 3 the wheel notching tools 45 are set in the blocks 46 which are reciprocated in the radial slots 47. The radial slots 47 are spaced at 120° intervals and are aligned with the press fingers 13, i.e., in a position equidistant between the support blocks 40. The top of the notching tools 45 projects upwards beyond the top of the support blocks 40 by a distance equal to the necessary depth of the notches to be made in the wheels. The blocks 46 together with the notching tools 45 are reciprocated by means of the threaded shafts 48 which in turn are rotated by means of the bevel gear assembly 49 driven by the motor 50.

Figure 2:
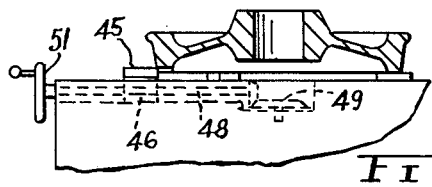
FIG. 2 is a partial vertical elevation taken from FIG. 1 and showing a manual means for operating the wheel notching mechanism.

In FIG. 2 there is shown a manual means for reciprocating the blocks 46 and notching tools 45. In this arrangement a hand wheel 51 is connected to one of the threaded shafts 48 to effect its rotation which in turn effects rotation of the other threaded shafts by means of the bevel gear assembly 49.

The first opeartion in the breaking of a wheel in the press is to notch the rim of the wheel by means of the apparatus illustrated in FIGS. 1, 2 and 3, or by any other suitable means such as grinding or pressing.

When using the notching apparatus illustrated, the wheel 42 is located over the press block 6 in the manner shown in FIG. 1 and in the first stage of opeartion rests with its rim 41 on the notching tools 45.

Pressure is then applied to cylinder 11, by opening the valve 27 thereby forcing the piston 10 downwards to bring the press fingers 13 into contact with the rim of the wheel at the spots directly above the notching tools 45. The operation of cutting the notches 44 by reciprocating the notching tools 45 is then proceeded with. As the notches are formed, the wheel 42 moves downwards until the wheel rim 41 rests on the support blocks 40. Pressure from cylinder 11 is then momentarily released and the notching tools are withdrawn. Pressure is then reapplied to the piston 10 to bring the press fingers 13 into contact with the rim of the wheel. During the downward movement of the piston 10, the piston 15 and press ring 17 are also moved downwards. The positions of the press fingers 13 and press ring 17 relative to the wheel are shown in FIG. 4.

Continued downward pressure on the piston 10 will increase the pressure of the press fingers 13 on the wheel rim. However, owing to even a slight unevenness in the thickness of the wheel rim, one of the fingers 13 will exert a maximum of pressure and cause the wheel to crack at the notch 44 immediately below. Further downward movement of the piston 10 will cause the wheel to crack at the position of the remaining notches 44 and the wheel will break along the chain dot lines 52 spreading out from the first notch crack towards the remaining notches. Thus two sectors A and B of the wheel are broken off, as shown in FIG. 5.

The remaining portion of the wheel is therefore supported on only one support block 40a and therefore tips over into the position shown in FIG. 6. During the downward movement of the piston 10, the valve 29 is opened causing a flow of fluid into the cylinder 14 and a downward movement of the piston 15 and press ring 17 thus permitting the press ring 17 to contact the web 53 of the wheel around its hub 43. Therefore, on breaking off of the sectors A and B the remaining portion of the wheel seen in FIG. 6 cannot become displaced relative to the axis of the press. Continued downward movement of the piston 15 causes a concentration of pressure on the web 47 of the wheel at a point in line with the support block 40a and the point of contact 54 of the hub with the top surface 7 of the base 6. Continued pressure will cause the web 53 to crack along the chain dot line 55 as seen in FIG. 7 thereby breaking the remaining portion of the wheel into a sector C and a boss section D.

The four broken sections of the wheel A, B, C and D are of approximately the same size and weight and suitable for easy handling and loading into a furnace for melting.

After the sections C and D have been broken, the valve 39 is opened and fluid is allowed to flow into the cylinder 14 below the piston 15, forcing the piston 15 upwards and carrying with it the piston 10 whereby clearing the press bed for removal of the broken wheel and the loading of another wheel to be broken.

Regardless of which press finger 13 causes the first crack at a notch in the wheel, the crack lines 52 develope uniformly in the direction of the remaining notches in the wheel, and the remaining portion of the wheel developes a crack line 55 uniformly as shown in FIG. 7.

The resulting broken sections of wheels can be easily handled and stored close to the furnace area and, when loaded into the furnace there is a uniformity of pack which contributes to an even and fast melt of the charge.

What I claim is:

1. Apparatus for breaking solid type railway car wheels into parts of approximately equal weight, the said apparatus comprising a press unit and an anvil unit axially aligned with each other, and means to notch the rim of the wheel to be broken at equally spaced intervals, the said anvil unit including a base member and a series of support blocks adapted to support the rim of the wheel midway between the notches in the rim of the wheel, the said press unit including a series of press fingers equally spaced around the axis of the press unit and in alignment with the notches in the rim of the wheel, and an annular press ring on said press unit, the said annular press ring being axially aligned with the axis of the wheel in a position between the hub and rim thereof, means to move the said press fingers into breaking contact with the rim of the wheel, and means to move the said annular press ring into breaking contact with one of the broken pieces of the wheel containing the wheel hub and a portion of the rim of the wheel to break off the wheel hub.

2. In apparatus as set forth in claim 1, in which the said means to notch the wheel includes a series of notching tools movable radially with respect to the axis of the wheel to be notched.

3. In apparatus as set forth in claim 1, in which the said notching tools are threaded on threaded shafts and means are provided to rotate the said shafts in either direction.

4. Apparatus as set forth in claim 1, in which the said press units includes a first press unit and a second press unit concentrically located about the first press unit, and the said annular press ring is mounted on the first press unit and the said press fingers are mounted on the said second press unit.

5. In apparatus as set forth in claim 4, in which means are provided to withdraw the said first press unit from the base member and the first press unit carries with it the second press unit.

References Cited in the file of this patent

UNITED STATES PATENTS

| | | |
|---|---|---|
| 344,735 | Hill et al. | June 29, 1886 |
| 623,853 | Ward et al. | Apr. 25, 1899 |
| 1,187,384 | Pecard-Chauveau | June 13, 1916 |
| 1,622,029 | Dovel | Mar. 22, 1927 |
| 1,704,872 | Schlenstedt | Mar. 12, 1929 |
| 1,929,264 | Speck et al. | Oct. 3, 1933 |

FOREIGN PATENTS

| | | |
|---|---|---|
| 1,092,278 | Germany | Nov. 3, 1960 |

UNITED STATES PATENT OFFICE
CERTIFICATE OF CORRECTION

Patent No. 3,164,312                               January 5, 1965

Stanislaw Antoni Purski

It is hereby certified that error appears in the above numbered patent requiring correction and that the said Letters Patent should read as corrected below.

In the grant, lines 1 to 3, for "Stanislaw Antoni Purski, of St. Laurent, Quebec, Canada," read -- Stanislaw Antoni Purski, of St. Laurent, Quebec, Canada, assignor to Canadian Vickers Limited, of Montreal, Quebec, Canada, --; line 12, for "Stanislaw Antoni Purski, his heirs" read -- Canadian Vickers Limited, its successors --; in the heading to the printed specification, lines 3 and 4, for "Stanislaw Antoni Purski, 1430 Depatie, St. Laurent, Quebec, Canada" read -- Stanislaw Antoni Purski, St. Laurent, Quebec, Canada, assignor to Canadian Vickers Limited, Montreal, Quebec, Canada --.

Signed and sealed this 27th day of April 1965.

(SEAL)
Attest:

ERNEST W. SWIDER                          EDWARD J. BRENNER
Attesting Officer                      Commissioner of Patents